(12) United States Patent
Morita et al.

(10) Patent No.: US 12,378,432 B2
(45) Date of Patent: Aug. 5, 2025

(54) FILM AND SUBSTRATE HAVING SURFACE COVERED WITH SAME

(71) Applicant: DAIKIN INDUSTRIES, LTD., Osaka (JP)

(72) Inventors: Masamichi Morita, Osaka (JP); Hiroki Yamaguchi, Osaka (JP); Atsushi Sakakura, Osaka (JP); Kazuki Hosoda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 395 days.

(21) Appl. No.: 17/735,565

(22) Filed: May 3, 2022

(65) Prior Publication Data

US 2022/0259454 A1   Aug. 18, 2022

Related U.S. Application Data

(63) Continuation of application No. PCT/JP2020/041121, filed on Nov. 2, 2020.

(30) Foreign Application Priority Data

Nov. 5, 2019  (JP) ................................ 2019-201076
Oct. 5, 2020  (JP) ................................ 2020-168146

(51) Int. Cl.
  *C09D 137/00* (2006.01)
  *C08F 24/00* (2006.01)

(52) U.S. Cl.
  CPC ............ *C09D 137/00* (2013.01); *C08F 24/00* (2013.01)

(58) Field of Classification Search
  None
  See application file for complete search history.

(56) References Cited

U.S. PATENT DOCUMENTS

| | | | |
|---|---|---|---|
| 3,308,107 A | 3/1967 | Selman | |
| 2010/0240560 A1 | 9/2010 | Shirakawa et al. | |
| 2011/0105686 A1 | 5/2011 | Kashiwagi | |
| 2012/0156504 A1* | 6/2012 | Takebe .................. | G03F 7/7095 524/544 |
| 2019/0048229 A1 | 2/2019 | Sakurai et al. | |
| 2020/0347258 A1 | 11/2020 | Yamaguchi et al. | |
| 2021/0231943 A1* | 7/2021 | Bellman .................. | G02B 3/14 |
| 2022/0259454 A1 | 8/2022 | Morita et al. | |

FOREIGN PATENT DOCUMENTS

| | | |
|---|---|---|
| EP | 2 821 846 | 1/2015 |
| EP | 2 821 847 | 1/2015 |
| EP | 4 056 370 | 9/2022 |
| EP | 4 089 122 | 11/2022 |
| EP | 4 089 153 | 11/2022 |
| EP | 4 089 447 | 11/2022 |
| JP | 43-29154 | 12/1968 |
| JP | 4-290746 | 10/1992 |
| JP | 2002-335112 | 11/2002 |
| JP | 2005-72695 | 3/2005 |
| JP | 2007-504125 | 3/2007 |
| JP | 2017-525785 | 9/2017 |
| KR | 10-2010-0092039 | 8/2010 |
| WO | 2005/021526 | 3/2005 |
| WO | 2009/104699 | 8/2009 |
| WO | 2013/129501 | 9/2013 |
| WO | 2013/129503 | 9/2013 |
| WO | 2015/187413 | 12/2015 |
| WO | 2017/122616 | 7/2017 |
| WO | 2017/179678 | 10/2017 |
| WO | 2021/090814 | 5/2021 |

OTHER PUBLICATIONS

Hong, Jiwoo et al., "Size-Selective Sliding of Sessile Drops on a Slightly Inclined Plane Using Low-Frequency AC Electrowetting", Langmuir, 2012, vol. 28, No. 15, pp. 6307-6312.
International Preliminary Report on Patentability issued May 10, 2022 in International (PCT) Application No. PCT/JP2020/041108.
International Preliminary Report on Patentability issued May 10, 2022 in International (PCT) Application No. PCT/JP2020/041121.
International Search Report issued Feb. 9, 2021 in International (PCT) Application No. PCT/JP2020/041108.
Masamichi Morita and Ikuo Yamamoto, Polymers, 2011, vol. 60, No. 12, pp. 870-871.
International Search Report issued Jan. 26, 2021 in International (PCT) Application No. PCT/JP2020/041121.
Extended European Search Report issued Mar. 26, 2024 in corresponding European Patent Application No. 20886044.5.
Extended European Search Report issued Nov. 21, 2023 in corresponding European Patent Application No. 20884995.0.
Database CA (Online), Chemical Abstracts Service, Seki Shigemi, "Laminates of fluoropolymer bearing dioxolane units", XP002808984, Apr. 2023.
Partial European Search Report issued Nov. 16, 2023 in corresponding European Patent Application No. 20886044.5.

\* cited by examiner

*Primary Examiner* — Ramsey Zacharia
(74) *Attorney, Agent, or Firm* — Wenderoth, Lind & Ponack, L.L.P.

(57) ABSTRACT

An object of the present disclosure is to provide a film that has high water slidability, and a substrate having a surface covered with the film. The present disclosure provides a film having the properties of a sliding velocity of 150 mm/s or more at an inclination angle of 30° and an average surface roughness (Ra) of 1 μm or less, and further provides a substrate having a surface covered with the film.

9 Claims, No Drawings

FILM AND SUBSTRATE HAVING SURFACE COVERED WITH SAME

TECHNICAL FIELD

The present disclosure relates to a film and a base material having a surface coated with the film.

BACKGROUND ART

Liquid repellency (water repellency or oil repellency) can be imparted by coating the surface of a base material with a liquid-repellent (water-repellant or oil-repellent) material.

Non-Patent Literature (NPL) 1 discloses that dynamic liquid repellency can be improved by controlling the fluoroalkyl group chain length or the α-position molecular structure of a fluoroacrylate polymer, which is a typical liquid-repellent material.

When dynamic liquid repellency that is higher than that of a fluoroacrylate polymer coating is required, the use of a "super-water-repellent surface," which is a surface with a lotus leaf effect mainly obtained by controlling the surface roughness (surface with a contact angle of 150° or more), is considered.

CITATION LIST

Patent Literature

NPL 1: "Dynamic Liquid Repellency of Fluoroacrylate Homopolymers," Polymer, 60(12), pp. 870-871, 2011

SUMMARY

This disclosure includes, for example, the following embodiment.

A film having the following properties: a sliding velocity of 150 mm/s or more at an inclination angle of 30° and an average surface roughness (Ra) of 1 μm or less.

Advantageous Effects

According to the present disclosure, there can be provided a film that has a high water sliding velocity (inclination angle: 30°) of 150 mm/s or more and that has an average surface roughness of 1 μm or less, and a base material that has a surface coated with the film.

DESCRIPTION OF EMBODIMENTS

The above summary of the present disclosure is not intended to describe each disclosed embodiment or every implementation of the present disclosure.

The description of the present disclosure that follows more specifically provides examples of illustrative embodiments.

In several places throughout the present disclosure, guidance is provided through lists of examples, and these examples can be used in various combinations.

In each instance, the provided list serves only as a representative group and should not be interpreted as an exclusive list.

All publications, patents, and patent applications cited herein are incorporated herein by reference in their entirety. Terms Unless otherwise specified, the symbols and abbreviations used in this specification can be assumed to have their ordinary meanings used in the technical field to which the present disclosure pertains, as understood from the context of the specification.

The terms "containing" and "comprising" as used herein are intended to include the meanings of the phrase "consisting essentially of" and the phrase "consisting of."

Unless otherwise specified, the steps, treatments, or operations described in the present specification can be performed at room temperature. In the present specification, room temperature can refer to a temperature within the range of 10 to 40° C.

In the present specification, the phrase "$C_n$-$C_m$" (wherein n and m are each a number) indicates that the number of carbon atoms is n or more and m or less, as a person skilled in the art would generally understand.

Unless otherwise specified, the "contact angle" as referred to herein can be measured using a commercially available contact angle meter, such as a DropMaster-series contact angle meter, manufactured by Kyowa Interface Science Co., Ltd., in accordance with the method disclosed in the section "4.1 Droplet Method" in "Method for Evaluating Water Repellency" (Koyo Fukuyama, Surface Technology, vol. 60, No. 1, 2009, pp. 21-26; also simply referred to below as "Method for Evaluating Water Repellency"). Specifically, the contact angle is determined by the method described in a specific example of the present disclosure.

The "sliding angle" as referred to herein means an inclination angle of the substrate at which water droplets start rolling on the substrate. Unless otherwise specified, the sliding angle can be determined by using a commercially available contact angle meter, such as a DropMaster-series contact angle meter, manufactured by Kyowa Interface Science Co., Ltd., in accordance with the method disclosed in the section "4.3 Sliding Method (Measurement on a slope)" in "Evaluation Method for Water Repellency." Specifically, the sliding angle is a value determined by the method described in a specific example of the present disclosure.

The "sliding velocity" as referred to herein means a speed at which a 20 μL of water droplets roll on the film coating of a substrate tilted at an inclination angle of 30°. Unless otherwise specified, the sliding velocity can be determined by using a commercially available contact angle meter, such as a DropMaster-series contact angle meter, manufactured by Kyowa Interface Science Co., Ltd., in accordance with the method disclosed in the section "4.4 Dynamic Sliding Method" in "Evaluation Method for Water Repellency." Specifically, the sliding velocity is a value determined by a method described in a specific example of the present disclosure.

Unless otherwise specified herein, the "average surface roughness" is determined by "arithmetic mean roughness" (Ra). Ra is a value obtained in the following manner. From a roughness curve, a portion of the roughness curve with a reference length in the direction of the average line is extracted. When the direction of the average line of the extracted portion is on the X-axis, and the direction of the vertical magnification is on the Y-axis, the roughness curve is represented by y=f(x). The value obtained by the following formula:

$$Ra = \frac{1}{l}\int_0^l \{f(x)\}dx$$

and expressed in micrometers (μm) is Ra. Specifically, the average surface roughness is a value determined by the method described in a specific example of the present disclosure.

The "transmittance" referred to herein means the total light transmittance of a film having an average film thickness of 200 μm using an NDH 7000SPII haze meter (produced by Nippon Denshoku Industries Co., Ltd.) in accordance with JIS K 7375:2008 "Plastics—Determination of the total luminous transmittance of transparent materials." Specifically, the transmittance is determined by the method described in a specific example of the present disclosure.

Unless otherwise specified herein, the "glass transition temperature" can be measured in accordance with the "Midpoint Glass Transition Temperature (Tmg)" in JIS K7121:2012 "Method for Measuring Transition Temperature of Plastic." Specifically, the glass transition temperature is a value determined by the method described in a specific example of the present disclosure.

Unless otherwise specified, the "average film thickness" as referred to herein can be determined by a method of measuring the cross-section of a film cut with a utility knife by using an atomic force microscope (AFM). Specifically, the average film thickness is a value determined by the method described in a specific example in the present disclosure.

In the present specification, unless otherwise specified, examples of "alkyl" include linear or branched $C_1$-$C_{10}$ alkyl, such as methyl, ethyl, propyl, isopropyl, butyl, isobutyl, sec-butyl, tert-butyl, pentyl, isopentyl, neopentyl, hexyl, heptyl, octyl, nonyl, and decyl.

In the present specification, unless otherwise specified, "fluoroalkyl" is alkyl in which at least one hydrogen atom is replaced with a fluorine atom. "Fluoroalkyl" can be linear or branched fluoroalkyl.

The number of carbon atoms in "fluoroalkyl" can be, for example, 1 to 12, 1 to 6, 1 to 5, 1 to 4, 1 to 3, 6, 5, 4, 3, 2, or 1.

The number of fluorine atoms in "fluoroalkyl" can be 1 or more (e.g., 1 to 3, 1 to 5, 1 to 9, 1 to 11, or 1 to the maximum substitutable number).

"Fluoroalkyl" includes perfluoroalkyl.

"Perfluoroalkyl" is alkyl in which all of the hydrogen atoms are replaced by fluorine atoms.

Examples of perfluoroalkyl include trifluoromethyl ($CF_3$—), pentafluoroethyl ($C_2F_5$—), heptafluoropropyl ($CF_3CF_2CF_2$—), and heptafluoroisopropyl (($CF_3$)$_2$CF—).

Specific examples of "fluoroalkyl" include monofluoromethyl, difluoromethyl, trifluoromethyl ($CF_3$—), 2,2,2-trifluoroethyl ($CF_3CH_2$—), perfluoroethyl ($C_2F_5$—), tetrafluoropropyl (e.g., $HCF_2CF_2CH_2$—), hexafluoropropyl (e.g., ($CF_3$)$_2$CH—), perfluorobutyl (e.g., $CF_3CF_2CF_2CF_2$—), octafluoropentyl (e.g., $HCF_2CF_2CF_2CF_2CH_2$—), perfluoropentyl (e.g., $CF_3CF_2CF_2CF_2CF_2$—), perfluorohexyl (e.g., $CF_3CF_2CF_2CF_2CF_2CF_2$—), and the like.

In the present specification, unless otherwise specified, "alkoxy" can be a group represented by RO—, wherein R is alkyl (e.g., $C_1$-$C_{10}$ alkyl).

Examples of "alkoxy" include linear or branched $C_1$-$C_{10}$ alkoxy, such as methoxy, ethoxy, propoxy, isopropoxy, butoxy, isobutoxy, sec-butoxy, tert-butoxy, pentyloxy, isopentyloxy, neopentyloxy, hexyloxy, heptyloxy, octyloxy, nonyloxy, and decyloxy.

In the present specification, unless otherwise specified, "fluoroalkoxy" is alkoxy in which at least one hydrogen atom is replaced with a fluorine atom. "Fluoroalkoxy" can be linear or branched fluoroalkoxy.

The number of carbon atoms in "fluoroalkoxy" can be, for example, 1 to 12, 1 to 6, 1 to 5, 1 to 4, 1 to 3, 6, 5, 4, 3, 2, or 1.

The number of fluorine atoms in "fluoroalkoxy" can be 1 or more (e.g., 1 to 3, 1 to 5, 1 to 9, 1 to 11, or 1 to the maximum substitutable number).

"Fluoroalkoxy" includes perfluoroalkoxy.

"Perfluoroalkoxy" is alkoxy in which all hydrogen atoms are replaced with fluorine atoms.

Examples of "perfluoroalkoxy" include trifluoromethoxy ($CF_3O$—), pentafluoroethoxy ($C_2F_5O$—), heptafluoropropoxy ($CF_3CF_2CF_2O$—), and heptafluoroisopropoxy (($CF_3$)$_2$CFO—).

Specific examples of "fluoroalkoxy" include monofluoromethoxy, difluoromethoxy, trifluoromethoxy, 2,2,2-trifluoroethoxy ($CF_3CH_2O$—), perfluoroethoxy ($C_2F_5O$—), tetrafluoropropyloxy (e.g. $HCF_2CF_2CH_2O$—), hexafluoropropyloxy (e.g., ($CF_3$)$_2$CHO—), perfluorobutyloxy (e.g., $CF_3CF_2CF_2CF_2O$—), octafluoropentyloxy (e.g., $HCF_2CF_2CF_2CF_2CH_2O$—), perfluoropentyloxy (e.g., $CF_3CF_2CF_2CF_2CF_2O$—), perfluorohexyloxy (e.g., $CF_3CF_2CF_2CF_2CF_2CF_2O$—), and the like.

Film

One embodiment of the present disclosure is a film having the following properties: a sliding velocity of water droplets (20 μL) of 150 mm/s or more at an inclination angle of 30° and an average surface roughness (Ra) of 1 μm or less. Although this film has a surface with a low average surface roughness of 1 μm or less, water droplets tend to slide down very easily at a high sliding velocity. Furthermore, this film has higher durability of the slidability, as compared to a surface having a lotus leaf effect due to having a rough surface. Based on these properties, the film of the present disclosure is suitable as a film for applications that require slidability and durability of the slidability, and is particularly suitable as an insulating film for electrowetting elements.

Dynamic water repellency can be defined according to the contact angle, sliding angle, sliding velocity, etc., among which the sliding velocity is particularly important. On the other hand, a "super-water-repellent surface" is generally defined as a surface with a contact angle of 150° or more, i.e., a surface that repels water droplets well on the spot.

The sliding velocity (inclination angle: 30°) is, for example, 150 mm/s or more, 150 mm/s to 250 mm/s, preferably 160 mm/s to 250 mm/s, and more preferably 170 mm/s to 250 mm/s.

The average surface roughness (Ra) is, for example, 1 μm or less, or 0.1 μm to 1 μm, preferably 0.1 μm to 0.7 μm, and more preferably 0.1 μm to 0.5 μm.

The sliding angle is, for example, 15° or less, and preferably 1° to 10°.

The contact angle of the film is, for example, 100° to 130°, preferably 100° to 120°, and more preferably 110° to 120°. The contact angle of the current super-water-repellent surface is approximately 150° or more. The film of the present disclosure can exhibit high sliding velocity even when the contact angle is about 100° to 130°.

The transmittance (total light transmittance) of the film is preferably 90% or more, more preferably 92% or more, and particularly preferably 95% or more, for a free-standing film having an average film thickness of 200 μm. The higher the permeability, the wider the range of film applications.

The average thickness of the film is preferably 10 nm or more, more preferably 50 nm to 10,000 nm, and particularly preferably 100 nm to 1,000 nm. When the average film thickness is in the above range, it is advantageous in terms of resistance to wear.

The film can be made of any material and can contain one or more polymers. Examples of such polymers include fluoropolymers, silicone polymers, and the like.

When the film contains a fluoropolymer, the type, molecular weight, and other details of the fluoropolymer are not particularly limited as long as the film has physical properties described above. From the viewpoint of slidability and durability of the slidability, the fluoropolymer preferably contains as a main component a unit represented by formula (1):

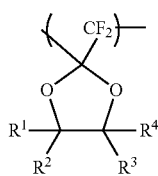

(1)

(wherein $R^1$ to $R^4$ are independently fluorine, fluoroalkyl, or fluoroalkoxy) (this unit may be referred to as "unit (1)" in the present specification). In the present specification, "containing a monomer unit as a main component" means that the proportion of a specific monomer unit is 50 mol % or more, based on all monomer units of the polymer.

The monomer unit of the fluoropolymer can contain only one, or two or more types of unit (1).

In each of $R^1$ to $R^4$, fluoroalkyl can be, for example, linear or branched $C_1$-$C_5$ fluoroalkyl, linear or branched $C_1$-$C_4$ fluoroalkyl, linear or branched $C_1$-$C_3$ fluoroalkyl, or linear or branched $C_1$-$C_2$ fluoroalkyl.

The linear or branched $C_1$-$C_5$ fluoroalkyl is preferably linear or branched $C_1$-$C_5$ perfluoroalkyl.

The linear or branched $C_1$-$C_4$ fluoroalkyl is preferably linear or branched $C_1$-$C_4$ perfluoroalkyl.

The linear or branched $C_1$-$C_3$ fluoroalkyl is preferably linear or branched $C_1$-$C_3$ perfluoroalkyl. The $C_1$-$C_2$ fluoroalkyl group is preferably $C_1$-$C_2$ perfluoroalkyl.

In each of $R^1$ to $R^4$, fluoroalkoxy can be, for example, linear or branched $C_1$-$C_5$ fluoroalkoxy, linear or branched $C_1$-$C_4$ fluoroalkoxy, linear or branched $C_1$-$C_3$ fluoroalkoxy, or $C_1$-$C_2$ fluoroalkoxy.

The linear or branched $C_1$-$C_5$ fluoroalkoxy is preferably linear or branched $C_1$-$C_5$ perfluoroalkoxy.

The linear or branched $C_1$-$C_4$ fluoroalkoxy is preferably linear or branched $C_1$-$C_4$ perfluoroalkoxy.

The linear or branched $C_1$-$C_3$ fluoroalkoxy is preferably linear or branched $C_1$-$C_3$ perfluoroalkoxy. The $C_1$-$C_2$ fluoroalkoxy is preferably $C_1$-$C_2$ perfluoroalkoxy.

$R^1$ to $R^4$ can be each independently fluorine, linear or branched $C_1$-$C_5$ fluoroalkyl, or linear or branched $C_1$-$C_5$ fluoroalkoxy.

$R^1$ to $R^4$ can be each independently fluorine, linear or branched $C_1$-$C_5$ perfluoroalkyl, or linear or branched $C_1$-$C_5$ perfluoroalkoxy.

$R^1$ to $R^4$ can be each independently fluorine, linear or branched $C_1$-$C_4$ fluoroalkyl, or linear or branched $C_1$-$C_4$ fluoroalkoxy.

$R^1$ to $R^4$ can be each independently fluorine, linear or branched $C_1$-$C_4$ perfluoroalkyl, or linear or branched $C_1$-$C_4$ perfluoroalkoxy.

$R^1$ to $R^4$ can be each independently fluorine, linear or branched $C_1$-$C_3$ fluoroalkyl, or linear or branched $C_1$-$C_3$ fluoroalkoxy.

$R^1$ to $R^4$ can be each independently fluorine, linear or branched $C_1$-$C_3$ perfluoroalkyl, or linear or branched $C_1$-$C_3$ perfluoroalkoxy.

$R^1$ to $R^4$ can be each independently fluorine, $C_1$-$C_2$ fluoroalkyl, or $C_1$-$C_2$ fluoroalkoxy.

$R^1$ to $R^4$ can be each independently fluorine, $C_1$-$C_2$ perfluoroalkyl, or $C_1$-$C_2$ perfluoroalkoxy.

$R^1$ to $R^4$ can be each independently fluorine, trifluoromethyl, pentafluoroethyl, or trifluoromethoxy.

At least one of $R^1$ to $R^4$ can be fluorine, and the other groups in $R^1$ to $R^4$ can be independently $C_1$-$C_2$ perfluoroalkyl or $C_1$-$C_2$ perfluoroalkoxy when two or more such other groups are present.

At least two of $R^1$ to $R^4$ can be fluorine, and the other groups in $R^1$ to $R^4$ can be independently $C_1$-$C_2$ perfluoroalkyl or $C_1$-$C_2$ perfluoroalkoxy when two or more such other groups are present.

At least three of $R^1$ to $R^4$ can be fluorine, and the other group in $R^1$ to $R^4$ can be $C_1$-$C_2$ perfluoroalkyl or $C_1$-$C_2$ perfluoroalkoxy.

At least three of $R^1$ to $R^4$ can be fluorine atoms, and the other group in $R^1$ to $R^4$ can be $C_1$-$C_2$ perfluoroalkyl.

$R^1$ to $R^4$ can be all fluorine atoms.

Unit (1) includes a monomer unit represented by the following formula (1-1) (this unit may be referred to as "unit (1-1)" in the present specification)

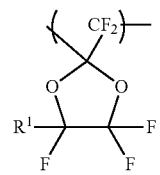

(1-1)

wherein $R^1$ is fluorine, fluoroalkyl, or fluoroalkoxy.

In unit (1-1), $R^1$ can be fluorine, linear or branched $C_1$-$C_5$ perfluoroalkyl, or linear or branched $C_1$-$C_5$ perfluoroalkoxy.

In unit (1-1), $R^1$ can be fluorine, linear or branched $C_1$-$C_4$ fluoroalkyl, or linear or branched $C_1$-$C_4$ fluoroalkoxy.

In unit (1-1), $R^1$ can be fluorine, linear or branched $C_1$-$C_4$ perfluoroalkyl, or linear or branched $C_1$-$C_4$ perfluoroalkoxy.

In unit (1-1), $R^1$ can be fluorine, linear or branched $C_1$-$C_3$ fluoroalkyl, or linear or branched $C_1$-$C_3$ fluoroalkoxy.

In unit (1-1), $R^1$ can be fluorine, linear or branched $C_1$-$C_3$ perfluoroalkyl, or linear or branched $C_1$-$C_3$ perfluoroalkoxy.

In unit (1-1), $R^1$ can be fluorine, $C_1$-$C_2$ fluoroalkyl, or $C_1$-$C_2$ fluoroalkoxy.

In unit (1-1), $R^1$ can be fluorine, $C_1$-$C_2$ perfluoroalkyl, or $C_1$-$C_2$ perfluoroalkoxy.

In unit (1-1), $R^1$ can be fluorine, trifluoromethyl, pentafluoroethyl, or trifluoromethoxy.

In unit (1-1), $R^1$ can be $C_1$-$C_2$ perfluoroalkyl or $C_1$-$C_2$ perfluoroalkoxy.

In unit (1-1), $R^1$ can be $C_1$-$C_2$ perfluoroalkyl.

Preferred examples of unit (1-1) include monomer units represented by the following formula (this monomer unit may be referred to as "unit (1-11)" in the present specification).

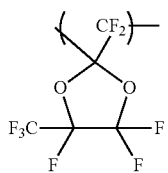

(1-11)

The amount of unit (1) is preferably 70 mol % or more, more preferably 80 mol % or more, even more preferably 90 mol % or more, and particularly preferably 100%, based on the total monomer units.

The fluoropolymer can contain other monomer units in addition to unit (1). Examples of such other monomer units include a tetrafluoroethylene unit ($-CF_2CF_2-$), a hexafluoropropylene unit ($-CF_2CF(CF_3)-$), a vinylidene fluoride unit ($-CH_2CF_2-$), and the like. The fluoropolymer can contain only one, or two or more types of monomer units. The amount of such other monomer units can be 50 mol % or less, preferably 30 mol % or less, more preferably 20 mol % or less, even more preferably 10 mol % or less, and particularly preferably 0%, based on the total monomer units.

The fluoropolymer can contain one or more other monomer units as long as the slidability and durability of the slidability are not substantially impaired. However, containing no other monomer units is preferable. Examples of such other monomer units include $-C(CF_3CF_2((CF_2CF_2)_m)H-CH_2-$ (wherein m is 1 or 2) and the like. The amount of such other monomer units can be, for example, 0 to 20 mol %, 0 to 10 mol %, or the like, based on the total monomer units.

The fluoropolymer preferably has a glass transition point (Tg) of 100° C. or more, more preferably 100° C. to 300° C., and even more preferably 100° C. to 200° C. When the glass transition point is within these ranges, it is advantageous in terms of high sliding velocity and in terms of bending durability of the film when the film is formed on a flexible substrate.

The mass average molecular weight of the fluoropolymer is, for example, in the range of 50,000 to 1,000,000, preferably 50,000 to 500,000, and more preferably 50,000 to 300,000. When the fluoropolymer has a molecular weight within the above ranges, it is advantageous in terms of high sliding velocity and in terms of bending durability of the film when the film is formed on a flexible base material.

The film has a fluoropolymer content of, for example, 50 mass % or more, preferably 80 mass % or more, and more preferably 90 mass % or more, based on the total mass of the film.

The fluoropolymer can be produced, for example, by polymerizing one or more monomers corresponding to monomer units of the fluoropolymer by an appropriate polymerization method. For example, the fluoropolymer can be produced by polymerizing only one, or two or more monomers (M1) corresponding to unit (1), optionally with one or more other monomers. A person skilled in the art would be able to understand monomers corresponding to the monomer units of the fluoropolymer.

For example, the monomer corresponding to unit (1) is a compound represented by formula (M1):

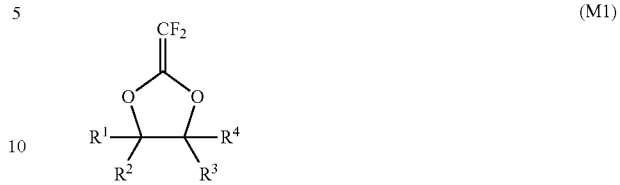

(M1)

(wherein $R^1$ to $R^4$ are as defined above) (this compound may be referred to as "monomer (Ml)" in the present specification).

For example, the monomer corresponding to unit (1-1) is a compound represented by formula (M1-1):

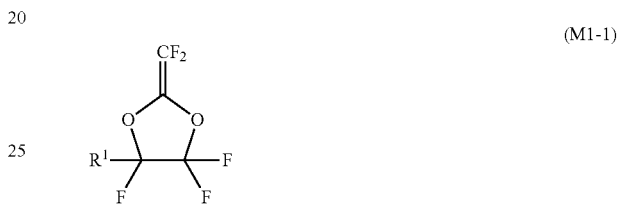

(M1-1)

(wherein $R^1$ is fluorine, fluoroalkyl, or fluoroalkoxy) (this compound may be referred to as "monomer (M1-1)" in the present specification).

For example, the monomer corresponding to unit (1-11) is a compound represented by formula (M1-11):

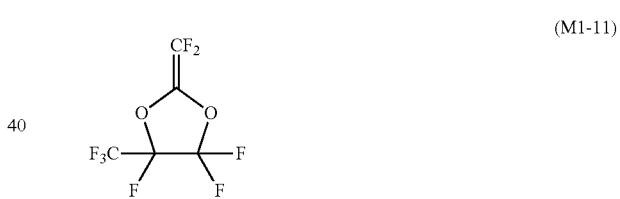

(M1-11)

(this compound may be referred to as "monomer (M1-11)" in the present specification).

For example, monomers corresponding to a tetrafluoroethylene unit ($-CF_2-CF_2-$), a hexafluoropropylene unit ($-CF_2CF(CF_3)-$), and a vinylidene fluoride unit ($-CH_2CF_2-$) are tetrafluoroethylene ($CF_2=CF_2$), hexafluoropropylene ($CF_2=CFCF_3$), and vinylidene fluoride ($CH_2=CF_2$), respectively.

The polymerization method includes, for example, a method of using appropriate amounts of monomers corresponding to the monomer units that constitute the fluoropolymer, with the monomers being optionally dissolved or dispersed in a solvent (e.g., an aprotic solvent) and a polymerization initiator being optionally added, and performing polymerization, such as radical polymerization, bulk polymerization, solution polymerization, suspension polymerization, or emulsion polymerization.

The polymerization method is preferably solution polymerization because the solution polymerization can produce a high-concentration solution of the fluoropolymer and thereby achieve a high manufacturing yield and purification is easy. Therefore, the fluoropolymer is preferably a fluoropolymer produced by solution polymerization. The fluoropolymer is more preferably produced by solution polymerization in which a monomer is polymerized in the presence of an aprotic solvent.

The solvent used in solution polymerization of the fluoropolymer is preferably an aprotic solvent. When an aprotic solvent is used to produce the fluoropolymer, the aprotic solvent can be used in an amount of 70 mass % or less, preferably 35 mass % to 70 mass %, more preferably more than 35 mass % to less than 70 mass %, even more preferably 50 mass % to less than 70 mass %, and particularly preferably 50 mass % to 69 mass %, based on the sum of the mass of the monomers and the mass of the solvent.

Preferred examples of polymerization initiators used in production of the fluoropolymer include di-n-propyl peroxydicarbonate, diisopropyl peroxydicarbonate, diisobutyryl peroxide, di(ω-hydro-dodecafluoroheptanoyl)peroxide, di(ω-hydro-hexadecafluorononanoyl)peroxide, ω-hydro-dodecafluoroheptanoyl-ω-hydro-hexadecafluorononanoyl-peroxide, benzoyl peroxide, tert-butyl peroxypivalate, tert-hexyl peroxypivalate, ammonium persulfate, sodium persulfate, and potassium persulfate.

Particularly preferred examples of polymerization initiators include di-n-propyl peroxydicarbonate, diisopropyl peroxydicarbonate, diisobutyryl peroxide, di(ω-hydro-dodecafluoroheptanoyl)peroxide, benzoyl peroxide, tert-butyl peroxypivalate, tert-hexyl peroxypivalate, and ammonium persulfate.

The amount of initiator used for the polymerization reaction can be, for example, 0.0001 g to 0.05 g, preferably 0.0001 g to 0.01 g, and more preferably 0.0005 g to 0.008 g, per gram of all the monomers subjected to the reaction.

The aprotic solvent used in the polymerization of fluoropolymers can be, for example, at least one member selected from the group consisting of perfluoroaromatic compounds, perfluorotrialkylamines, perfluoroalkanes, hydrofluorocarbons, perfluorocyclic ethers, and hydrofluoroethers.

The perfluoroaromatic compound is, for example, a perfluoroaromatic compound optionally having one or more perfluoroalkyl groups. The aromatic ring of the perfluoroaromatic compound can be at least one ring selected from the group consisting of a benzene ring, a naphthalene ring, and an anthracene ring. The perfluoroaromatic compound can have one or more (e.g., one, two, or three) aromatic rings.

The perfluoroalkyl group as a substituent is, for example, linear or branched, $C_1$-$C_6$, $C_1$-$C_5$, or $C_1$-$C_4$ perfluoroalkyl, and preferably linear or branched $C_1$-$C_3$ perfluoroalkyl.

The number of substituents is, for example, one to four, preferably one to three, and more preferably one or two. When a plurality of substituents are present, the substituents may be the same or different.

Examples of perfluoroaromatic compounds include perfluorobenzene, perfluorotoluene, perfluoroxylene, and perfluoronaphthalene.

Preferred examples of perfluoroaromatic compounds include perfluorobenzene and perfluorotoluene.

The perfluorotrialkylamine is, for example, an amine substituted with three linear or branched perfluoroalkyl groups. The number of carbon atoms of each perfluoroalkyl group is, for example, 1 to 10, preferably 1 to 5, and more preferably 1 to 4.

The perfluoroalkyl groups can be the same or different, and are preferably the same.

Examples of perfluorotrialkylamines include perfluorotrimethylamine, perfluorotriethylamine, perfluorotripropylamine, perfluorotriisopropylamine, perfluorotributylamine, perfluorotri-sec-butylamine, perfluorotri-tert-butylamine, perfluorotripentylamine, perfluorotriisopentylamine, and perfluorotrineopentylamine.

Preferred examples of perfluorotrialkylamines include perfluorotripropylamine and perfluorotributylamine.

The perfluoroalkane is, for example, a linear, branched, or cyclic $C_3$-$C_{12}$ (preferably $C_3$-$C_{10}$, more preferably $C_3$-$C_6$) perfluoroalkane.

Examples of perfluoroalkanes include perfluoropentane, perfluoro-2-methylpentane, perfluorohexane, perfluoro-2-methylhexane, perfluoroheptane, perfluorooctane, perfluorononane, perfluorodecane, perfluorocyclohexane, perfluoro(methylcyclohexane), perfluoro(dimethylcyclohexane) (e.g., perfluoro(1,3-dimethylcyclohexane)), and perfluorodecalin.

Preferred examples of perfluoroalkanes include perfluoropentane, perfluorohexane, perfluoroheptane, and perfluorooctane.

The hydrofluorocarbon is, for example, a $C_3$-$C_8$ hydrofluorocarbon. Examples of hydrofluorocarbons include $CF_3CH_2CF_2H$, $CF_3CH_2CF_2CH_3$, $CF_3CHFCHFC_2F_5$, 1,1,2,2,3,3,4-heptafluorocyclopentane, $CF_3CF_2CF_2CF_2CH_2CH_3$, $CF_3CF_2CF_2CF_2CF_2CHF_2$, and $CF_3CF_2CF_2CF_2CF_2CF_2CH_2CH_3$.

Preferred examples of hydrofluorocarbons include $CF_3CH_2CF_2H$ and $CF_3CH_2CF_2CH_3$.

The perfluorocyclic ether is, for example, a perfluorocyclic ether optionally having one or more perfluoroalkyl groups. The ring of the perfluorocyclic ether may be a 3- to 6-membered ring. The ring of the perfluorocyclic ether may have one or more oxygen atoms as a ring-constituting atom. The ring preferably has one or two oxygen atoms, and more preferably one oxygen atom.

The perfluoroalkyl group as a substituent is, for example, linear or branched $C_1$-$C_6$, $C_1$-$C_5$, or $C_1$-$C_4$ perfluoroalkyl. The perfluoroalkyl group is preferably linear or branched $C_1$-$C_3$ perfluoroalkyl.

The number of substituents is, for example, one to four, preferably one to three, and more preferably one or two. When a plurality of substituents are present, they may be the same or different.

Examples of perfluorocyclic ethers include perfluorotetrahydrofuran, perfluoro-5-methyltetrahydrofuran, perfluoro-5-ethyltetrahydrofuran, perfluoro-5-propyltetrahydrofuran, perfluoro-5-butyltetrahydrofuran, and perfluorotetrahydropyran.

Preferred examples of perfluorocyclic ethers include perfluoro-5-ethyltetrahydrofuran and perfluoro-5-butyltetrahydrofuran.

The hydrofluoroether is, for example, a fluorine-containing ether.

The hydrofluoroether preferably has a global warming potential (GWP) of 400 or less, and more preferably 300 or less.

Examples of hydrofluoroethers include $CF_3CF_2CF_2CF_2OCH_3$, $CF_3CF_2CF(CF_3)OCH_3$, $CF_3CF(CF_3)CF_2OCH_3$, $CF_3CF_2CF_2CF_2OC_2H_5$, $CF_3CH_2OCF_2CHF_2$, $C_2F_5CF(OCH_3)C_3F_7$, trifluoromethyl 1,2,2,2-tetrafluoroethyl ether (HFE-227me), difluoromethyl 1,1,2,2,2-pentafluoroethyl ether (HFE-227mc), trifluoromethyl 1,1,2,2-tetrafluoroethyl ether (HFE-227pc), difluoromethyl 2,2,2-trifluoroethyl ether (HFE-245mf), and 2,2-difluoroethyltrifluoromethyl ether (HFE-245pf).

Preferred examples of hydrofluoroethers include $CF_3CF_2CF_2CF_2OCH_3$, $CF_3CF_2CF_2CF_2OC_2H_5$, $CF_3CH_2OCF_2CHF_2$, and $C_2F_5CF(OCH_3)C_3F_7$.

The hydrofluoroether is preferably a compound represented by the following formula (B1):

$$R^{21}-O-R^{22} \quad (B1)$$

(wherein $R^{21}$ is linear or branched perfluorobutyl and $R^{22}$ is methyl or ethyl).

As the aprotic solvent, a hydrofluoroether is preferable because it has less environmental impact during use and polymers can be dissolved at high concentrations in it.

The amount of the aprotic solvent used in the polymerization reaction can be, for example, 20 mass % to 300 mass %, preferably 35 mass % to 300 mass %, and more preferably 50 mass % to 300 mass %, based on the monomer amount defined as 100 mass.

The temperature of the polymerization reaction can be, for example, −10° C. to 160° C., preferably 0° C. to 160° C., and more preferably 0° C. to 100° C.

The reaction time for the polymerization reaction is preferably 0.5 to 72 hours, more preferably 1 to 48 hours, and even more preferably 3 to 30 hours.

The polymerization reaction can be performed in the presence or absence of an inert gas (e.g., nitrogen gas), and preferably in the presence of an inert gas.

The polymerization reaction can be performed under reduced pressure, atmospheric pressure, or increased pressure.

The polymerization reaction can be performed by adding the monomer to an aprotic solvent containing the polymerization initiator. The polymerization reaction can also be performed by adding the polymerization initiator to the aprotic solvent containing the monomer and subjecting the monomer to polymerization conditions.

The fluorine-containing polymer produced by the polymerization reaction can be purified, if desired, by a conventional method, such as extraction, dissolution, concentration, filtration, precipitation, dehydration, adsorption, or chromatography, or a combination of these methods. Alternatively, a solution of the fluoropolymer produced by the polymerization reaction, a dilute solution thereof, or a mixture of the solution with other optional components or the like is dried or heated (e.g., 50° C. to 200° C.) to form a film containing the fluoropolymer.

The film can contain one or more other components in addition to the fluoropolymer as long as the slidability and durability of the slidability is not substantially impaired. Examples of such other components include polymerization initiators, starting material monomers, oligomers, other fluoropolymers, and the like. "Other fluoropolymers" refers to such fluoropolymers that films formed from them alone do not have one or either of the following properties of the film of the present disclosure: a sliding velocity of 150 mm/s at an inclination angle of 30°, and an average surface roughness (Ra) of 1 μm or less. Examples of such other fluoropolymers include fluoro(meth)acrylate polymers and the like.

The content of such other components in the film is, for example, 50 mass % or less, preferably 20 mass % or less, and more preferably 10 mass % or less, based on the total mass of the film.

The film of the present disclosure has high slidability even when the contact angle is about 100° to 130°. The film of the present disclosure has high durability of its slidability.

The film of the present disclosure can achieve a total light transmission of 90% or more. The film of the present disclosure can be used in applications in which high slidability or high durability of the slidability is required, such as insulating films for electrowetting elements.

The film of the present disclosure can be used for forming anti-reflection films, such as for displays, solar cells, optical lenses, eyeglass lenses, sensor lenses, lens covers, show windows, and showcases; for forming liquid-repellant (water-repellant, oil-repellant), anti-fouling, and moisture-proof protective films, such as for displays, solar cells, optical lenses, eyeglass lenses, sensor lenses, lens covers, show windows, showcases, CDs, DVDs, Blu-ray discs, photosensitive and fusing drums, and flexible substrates for printers; for forming protective films of semiconductor elements (e.g., interlayer films and buffer coating films); for forming moisture-proof films for elements (e.g., moisture-proof film for RF circuit elements, GaAs devices, InP devices, or the like); for forming optical thin films such as pellicle film; for forming chemical-resistant films; for forming passivation films; for forming liquid-crystal light-distribution films; for forming anti-fouling films for medical instruments; for forming gate insulating films; and the like.

Base Material

The base material of the present disclosure is a base material whose surface is coated with the film. The degree of coating is not particularly limited as long as at least the portion that is required to be coated is coated. The portion coated may be all or part of the surface of the base material.

The material of the base material is not particularly limited as long as the film can be fixed. The material can be appropriately selected according to the application etc. Examples of the material include glass, resins (natural or synthetic resins, such as general plastic materials), metals (single metals, such as aluminum, copper, and iron, or metal composites, such as alloys), ceramics, semiconductors (e.g., silicon and germanium), fibers (e.g., fabrics and nonwoven fabrics), furs, leather, wood, ceramics, stone materials, construction materials, and the like. When the base material of the present disclosure is used for electrowetting elements, the material of the base material can be materials known to be used in transparent substrates for electrowetting elements (e.g., polyethylene terephthalate (PET) resin, polycarbonate (PC) resin, polyimide (PI) resin, polymethyl methacrylate (PMMA), and polystyrene resin).

The shape, size, etc. of the base material can also be appropriately selected according to the application and other factors.

The portion of the base material surface to be coated with the fluoropolymer film can be surface-treated by plasma treatment or the like to enhance the adhesion between the base material surface and the film as long as the slidability and durability of the slidability are not substantially impaired.

Preferably, the film is directly coated on the surface of the base material. However, one or more layers (e.g., a primer-like layer formed to enhance the adhesion between the film and the base material) can be added between the film and the base material.

The base material of the present disclosure can be produced by applying the fluoropolymer to a base material by known coating methods. For example, at least one monomer corresponding to the monomer unit of the fluoropolymer is dissolved or dispersed in a solvent, and a polymerization initiator is added to prepare a coating liquid. This coating liquid is applied to the base material and the resulting base material is subjected to polymerization conditions to thereby form a film on the surface of the base material, thus producing the base material of the present disclosure. The coating liquid preferably contains a reaction mixture obtained by the solution polymerization method described above. Therefore, the solvent of the coating liquid is preferably an aprotic solvent, and more preferably hydrofluoroether. In the coating liquid for forming the film, the fluoropolymer content is, for example, 0.01 mass % to 70 mass, preferably 0.02 to 50 mass %, more preferably 0.05 to 15 mass %, and particularly preferably 0.1 mass % to 5 mass %.

The base material of the present disclosure can also be produced by applying a coating liquid, which is prepared by dissolving or dispersing the fluoropolymer in an appropriate solvent, to the surface of the base material and then dried, heated, or otherwise treated to remove the solvent, thus forming a film.

Alternatively, the base material can also be coated with a film by other methods, such as a method comprising vapor-depositing the fluoropolymer onto the base material, or a method comprising laminating onto the base material a fluoropolymer film that has been prepared beforehand by a casting method or the like.

The base material of the present disclosure can be used in applications in which high slidability or durability of the slidability is required, such as a substrate comprising an insulating film for electrowetting elements.

Although embodiments have been described above, it will be understood that various changes in form and detail can be made without departing from the intent and scope of the claims.

This disclosure includes, for example, the following embodiment.

Item 1.

A film having the following properties: a sliding velocity of 150 mm/s or more at an inclination angle of 30° and an average surface roughness (Ra) of 1 μm or less.

Item 2.

The film according to Item 1, further having the following property: a contact angle of 100° to 130°.

Item 3.

The film according to Item 1 or 2, further having the following property: a total light transmittance of 90% or more.

Item 4.

The film according to any one of Items 1 to 3, further having the following property: a sliding angle of 15° or less.

Item 5.

The film according to any one of Items 1 to 4, having an average film thickness of 10 nm or more.

Item 6.

The film according to any one of Items 1 to 5, comprising a fluoropolymer.

Item 7.

The film according to Item 6, wherein the fluoropolymer has a glass transition temperature (Tg) of 100° C. or more.

Item 8.

The film according to Item 6 or 7, wherein the fluoropolymer contains as a main component a monomer unit represented by the following formula (1):

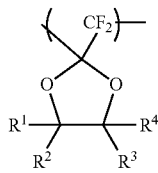

(1)

wherein $R^1$ to $R^4$ each independently represent fluorine, fluoroalkyl, or fluoroalkoxy.

Item 9.

The film according to any one of Items 6 to 8, wherein the fluoropolymer contains as a main component a monomer unit represented by the following formula (1-1):

(1-1)

wherein $R^1$ represents fluorine, fluoroalkyl, or fluoroalkoxy.

Item 10.

The film according to any one of Items 1 to 9, wherein the film is an insulating film for an electrowetting element.

Item 11.

A base material having a surface coated with the film of any one of Items 1 to 10.

Item 12.

The base material according to claim 11, wherein the base material is a glass base material or a plastic base material.

Item 13.

The base material according to Item 11 or 12, wherein the film is an insulating film for an electrowetting element and the base material is a substrate for an electrowetting element.

EXAMPLES

An embodiment of the present disclosure is described in more detail below with Examples; however, the present disclosure is not limited to these.

In the Examples, "Mw" means mass average molecular weight.

Contact Angle

The contact angle was measured with a Drop Master 701 meter (produced by Kyowa Interface Science Co., Ltd.). The same sample was measured 5 times, and the average was determined to be the contact angle.

After a water droplet of 2 μL or 5 μL was formed on the tip of an injection needle (Kyowa Interface Science Co., Ltd., product No. 506, needle: 22 G, outer diameter/inner diameter: 0.71 mm/0.47 mm), the distance between the surface of a coated substrate placed on a horizontal sample stage and the water droplet on the tip of the injection needle was gradually shortened by moving the sample stage. When both came into contact, the sample stage and the injection needle were immobilized. Subsequently, by moving the sample stage, the sample stage was slowly separated from the injection needle to deposit the water droplet onto the surface of the coated substrate. One second after the droplet was deposited, a still image of the water droplet was photographed. Photographing was conducted by setting the post-droplet deposition to 1000 ms and the zoom magnification to "STD" beforehand in the DropMaster control program FAMAS. Based on the still image, the contact angle was determined using the θ/2 method, assuming the outline of the water droplet to be a perfect circle.

When a water droplet did not adhere to the surface of the coated substrate, and could not be deposited with a droplet volume of 2 μL, the measurement was conducted with a droplet volume of 5 μL.

Sliding Angle and 5-mm Move-Slide Angle

The sliding angle was measured with a Drop Master 701 meter (produced by Kyowa Interface Science Co., Ltd.). The same sample was measured 3 times, and the average was determined to be the sliding angle or 5-mm move-slide angle.

After a water droplet of 20 μL was formed on the tip of an injection needle (Kyowa Interface Science Co., Ltd., product No. 508, needle: 15 G, outer diameter/inner diameter: 1.80 mm/1.30 mm), the distance between the surface of a coated substrate placed on a horizontal sample stage and the water droplet on the tip of the injection needle was gradually shortened by moving the sample stage. When both came into contact, the sample stage and the injection needle were immobilized. Subsequently, by moving the sample stage, the sample stage was slowly separated from the injection needle to deposit the water droplet on the surface of the coated substrate. Within approximately 5 seconds after the droplet was deposited, the sample stage was tilted at a tilt rate of 2° per second, and a still image (the width of the still image being 12 mm) of the water droplet on the surface of the substrate was photographed at a zoom magnification of W1 every 1° tilt angle. The tilt angle of the sample stage at the time the contact line of the water droplet on the receding side started to move (when the sample stage was moved by 0.1 to 1 mm on the measurement screen; the actual liquid droplet moving distance was 10 to 100 μm) was taken as the sliding angle.

The tilt angle at which the water droplet moved and disappeared from the measurement screen at a zoom magnification of W1 was recorded as the "5-mm move-slide angle" to distinguish it from the "sliding angle" described above. The 5-mm move-slide angle is included in the roll-off angle defined in "Paints and varnishes—Wettability—Part 7: Measurement of the contact angle on a tilt stage (roll-off angle)" according to ISO 19403-7:2017. ISO 19403-7:2017 defines the travel distance of a liquid droplet as 1 mm or more, and the 5-mm move-slide angle is a tilt angle at which the liquid droplet moves by 5 mm or more.

Sliding Velocity

The sliding velocity was measured with a Drop Master 701 meter (produced by Kyowa Interface Science Co., Ltd.). The same sample was measured 3 times, and the average was determined to be the sliding velocity.

20 μL of the water droplet was formed after an injection needle (Kyowa Interface Science Co., Ltd., product No. 506, needle 22 G, outer diameter/inner diameter: 0.71 mm/0.47 mm) nearly came into contact with the surface of a coated substrate placed on a sample stage inclined at 30° beforehand. At this stage, the water droplet was motionless on the inclined coated substrate due to the injection needle. Within approximately 5 seconds after the water droplet was formed, the injection needle was moved and pulled away from the droplet, causing the droplet to slide, and the behavior of the water droplet was captured in still images every 5 milliseconds (200 frames per second) with a high-speed camera. The zoom magnification for photographing was W2. Only when the contact line of the water droplet on the forward side was able to move by 15 to 20 mm per second was the water droplet determined to have slid. The results were plotted on a graph with the time taken for the water droplet to slide (seconds) on the horizontal axis and the distance traveled by the water droplet (mm) on the vertical axis. The inclination of the graph fit to least squares, assuming a linear function passing through the origin, was determined to be the sliding velocity (mm/s).

Mass Average Molecular Weight

The mass average molecular weight was determined by gel permeation chromatography (GPC) as shown below.

Sample Adjusting Method

A polymer was dissolved in perfluorobenzene to produce a 2 wt % polymer solution, which was passed through a membrane filter (0.22 μm) to produce a sample solution.

Measurement Method

Molecular weight standard sample: polymethyl methacrylate Detection method: RI (refractive index detector)

Surface Roughness (Ra)

The surface roughness (Ra) was measured using a VK-9710 laser microscope (produced by Keyence Corporation).

From a roughness curve, only the reference length in the direction of the average line is extracted. When the direction of the average line of the extracted portion is on the X axis, and the direction of the vertical magnification is on the Y axis, the roughness curve is represented by y=f(x). The value obtained by the following formula:

$$Ra = \frac{1}{\ell} \int_0^\ell \{f(x)\} dx$$

was expressed in micrometer (μm).

Total Light Transmittance

The transmittance was measured using an NDH 7000SPII haze meter (produced by Nippon Denshoku Kogyo Co., Ltd.) in accordance with JIS K 7375:2008 "Plastics—Test method for total light transmittance of transparent materials."

Glass Transition Temperature (Tg)

The glass transition temperature (Tg) of the fluoropolymer was measured using a DSC (differential scanning calorimeter; Hitachi High-Tech Science Corporation, DSC7000) by increasing the temperature (first run), decreasing the temperature, and then increasing the temperature (second run) at 10° C./minute in the temperature range of 30° C. to 200° C. The midpoint of the endothermic curve in the second run was determined to be the glass transition temperature (° C.).

Average Film Thickness

The average film thickness was defined as a difference in height between the substrate and the coating film, which is obtained by measuring, by using an atomic force microscope (AFM), the line profile of the cross-section of a coating film of the coated base material that was cut to the substrate with a cutter knife. The same sample was measured 5 times, and the average was determined to be the film thickness.

Production Example 1: Synthesis of Fluoropolymer (Dioxolane Skelton-Containing Polymer; Fluoropolymer A) Containing Unit (1-11) as Main Component The compound (2-(difluoromethylene)-4,4,5-trifluoro-5-(trifluoromethyl)-1,3-dioxolane) represented by the above formula (M1-11) was used as a monomer to produce a polymer (also referred to as "fluoropolymer A") containing unit (1-11) as the main component. The details are described below.

After 10 g of the monomer, 15 g of a solvent (methyl nonafluorobutyl ether), and 0.017 g of an initiator solution (a methanol solution containing 50 mass % of di-n-propyl peroxydicarbonate) were added to a 50-mL glass vessel, heating was performed so that the internal temperature reached 40° C., thus performing polymerisation reaction for 20 hours to give a reaction mixture containing 36 mass % of a fluoropolymer (fluoropolymer A) composed of unit (1-11).

The reaction mixture was distilled off by vacuum drying at 120° C. to give a target fluoropolymer (8.5 g (Mw: 273,268)).

The glass transition temperature (Tg) of the polymer was 129° C.

Comparative Production Example 1: Synthesis of Rf(C8) Acrylate Homopolymer

A solution (Novec 7300, 3M Japan Limited) containing 20 mass % of 2-(perfluorooctyl)ethyl acrylate (also referred to as "Rf(C8)acrylate") was added to a four-necked flask, heated at 80° C. under stirring, and subjected to nitrogen substitution for 30 minutes. N-azobisisobutyronitrile was added in an amount of 1 mol % relative to the Rf(C8) acrylate to perform a reaction for 12 hours. The reaction mixture was brought back to room temperature and added dropwise to methanol, thus precipitating a produced polymer. After removal of methanol by decantation, the polymer was dried under reduced pressure to give an Rf(C8) acrylate homopolymer.

Example 1: Substrate Coated With Fluoropolymer Solution (Fluoropolymer A/Fluorinert FC-770)

The fluoropolymer A obtained in Production Example 1 was diluted with a fluorinated solvent (Fluorinert FC-770, 3M Japan Limited) to 1 mass % to give a fluoropolymer solution. The solution was spin-coated (2000 rpm) on a silicone wafer and heat-treated at 180° C. for 10 minutes to produce a coated substrate.

Measurement of the cutting area by AFM showed that the average film thickness was about 100 nm. One day later, the liquid repellency (contact angle, sliding angle, 5-mm move-slide angle, and sliding velocity) and surface roughness of the produced substrate were measured. The results of the surface roughness and liquid repellency are shown in Table 1. The results of the surface roughness and liquid repellency of Examples 2 to 10, Reference Examples 1 to 3, and Comparative Examples 1 to 14 are also shown in Table 1. In Table 1, "avg," "sd," and "Δα" respectively indicate the average value, standard deviation, and difference between the "5-mm move-slide angle (°) and the sliding angle (°).

Examples 2 to 5: Substrates Coated With Fluoropolymer Solutions Prepared From Fluorinated Solvents Other Than Fluorinert FC-770

Coated substrates were produced in the same manner as in Example 1 except that the fluorinated solvent (Fluorinert FC-770 (also referred to as "FC-770")) was replaced with perfluorobenzene (also referred to as "PFBz") in Example 2, a solution containing 1 mass % of a mixture of methyl nonafluorobutyl ether and methyl nonafluoroisobutyl ether (Novec 7100, 3M Japan Limited) in Example 3, a solution containing 1 mass % of a mixture of ethyl nonafluorobutyl ether and ethyl nonafluoroisobutyl ether (Novec 7200, 3M Japan Limited) in Example 4, and a solution containing 1 mass % of 1,1,1,2,2,3,4,5,5,5-decafluoro-3-methoxy-4-(trifluoromethyl)-pentane (Novec 7300, 3M Japan Limited) in Example 5.

The liquid repellency and surface roughness of these coated substrates were measured one day later.

Examples 6 to 10: Fluoropolymer A-Coated Substrates (Without Heat Treatment)

Coated substrates were produced in the same manner as in Examples 1 to 5 except that the heat treatment step (180° C.) was not conducted, and the liquid repellency and surface roughness of the coated substrates were measured one day later.

Water Repellency Properties of Substrates Produced in Examples 1 to 10

The coated substrates of the present disclosure (coated substrates produced in Examples 1 to 10) had a contact angle of 115° or more and a sliding velocity of 170 mm/s or more. The sliding velocity was very high and comparable to the super-water-repellent uneven surface (surface roughness Ra: 14 μm or more) of the Reference Example described below. The sliding angle was as small as 15° or less.

Example 11: Production of Free-Standing Films Produced From Solutions of Fluoropolymer A Dissolved in Various Fluorinated Solvents and Measurement of Transmittance The fluoropolymer A obtained in Production Example 1 was dissolved in various fluorinated solvents to produce solutions having a fluoropolymer A concentration of 10 mass. Each of the solutions was applied and air-dried by a casting method on a melt fluororesin FEP film to produce a free-standing film with a thickness of 200 μm. The total light transmittance of the film was measured. The total light transmittance obtained when FC-770, PFBz, Novec 7100, Novec 7200, and Novec 7300 were individually used as a fluorinated solvent was respectively 94%, 93%, 91%, 94%, and 95%.

Reference Example 1: Super-Water-Repellent Uneven Surface; Substrate With UV-Cured Coating Film of Multifunctional Acrylate and Silica Fine Particle Copolymer Treated With Rf(C6) Methacrylate/Methacryloylpropyltrimethoxysilane The UV-cured coating film of multifunctional acrylate and silica fine particle copolymer treated with Rf(C6) methacrylate/methacryloylpropyltrimethoxysilane described in Example 6 of WO2017/179678 was produced on an aluminum substrate. The surface roughness Ra was 14.7 μm. The liquid repellency and surface roughness were measured one day later. Measurement of the total light transmittance of the free-standing film in the same manner as in Example 11 showed that the free-standing film was completely clouded, and the total light transmittance was 0%. The coating film was produced as follows.

Preparation of Copolymer Solution of Rf(C6) Methacrylate and Fine Particles 25.46 g of $C_6F_{13}CH_2CH_2OCOC(CH_3)=CH_2$ (also referred to as "Rf(C6) methacrylate"), 12.70 g of silica fine particles having an average primary particle size of 12 nm and having a radically reactive group on the surface, and 663.49 g of perfluorobutyl ethyl ether were placed in a side-arm test tube. The test tube was purged with nitrogen and heated to 70° C. Further, 1.26516 g of AIBN was added thereto and a reaction was conducted for 6 hours. After polymerization, the solids concentration was calculated.

Preparation of Photosensitive Solution 0.4015 g of trimethylolpropane triacrylate (TMPTA), 0.0403 g of alkylphenone photoinitiator, 1.10668 g of IPA, and 8.8769 g of perfluorobutyl ethyl ether were placed in a vial and irradiated with ultrasonic waves by using an ultrasonic washing machine, and 9.7518 g of a copolymer solution having a solids content of 4.19% was added. The resulting mixture was irradiated with ultrasonic waves by using an ultrasonic washing machine to produce a photosensitive solution.

Production of Coating Film

An aluminum substrate was treated with the photosensitive solution by a dip method. The treated aluminum substrate was then placed in a metal box in which gas can flow, and nitrogen was allowed to flow in the box at a flow rate of 10 L/min for 3 minutes. The whole box was then placed in a belt-conveyor UV irradiation device and irradiated with ultraviolet rays at 1,800 mJ/cm$^2$. The fluorine atom content of the produced coating film was 41.5 mass %, based on all the coating film components.

Reference Example 2: Super-Water-Repellent Uneven Surface; Substrate Coated With Commercially Available Product HIREC 100

The liquid repellency and surface roughness of a super-water-repellent sample (plate ID: 6500-2) obtained by applying HIREC 100 (NTT Advanced Technology Corporation) to an aluminum substrate were measured. The super-water-repellent sample was produced by spray-coating HIREC 100 onto a coating film formed by spray-coating an underpaint (UP) onto an aluminum plate (product of NTT Advanced Technology Corporation, Environmental Business Unit).

Reference Example 3: Super-Water-Repellent Uneven Surface; Inner Lid of Commercially Available Yoghurt The liquid repellency and surface roughness at the back side (side in contact with yoghurt) of the inner lid of the container of aloe yoghurt produced by Morinaga Milk Industry Co., Ltd., were measured.

Liquid Repellency of Super-Water-Repellent Uneven Surfaces Described in Reference Examples 1 to 3

The super-water-repellent uneven surfaces of Reference Examples 1 to 3 had a contact angle of 150° or more, a sliding angle of 1° or less, and a sliding velocity of 200 mm/s or more. Thus, the super-water-repellent uneven surface has outstanding liquid repellency; however, there are problems such that the coating film becomes cloudy, the wear resistance is poor, powder falling occurs, and the liquid repellency properties are impaired when dirt enters microscopic dents on the uneven surface.

On the other hand, as compared to these super-water-repellent uneven surfaces, the fluoropolymer A films of Examples 1 to 10 had advantages of amorphous fluororesin polymers, i.e., the coating film is transparent, the abrasion resistance is high, powder falling is suppressed, and the dirt resistance is high. The fluoropolymer A films of Examples 1 to 10 also had high liquid repellency in terms of sliding angle, 5-mm move-slide angle, and sliding velocity.

Comparative Example 1: Substrate Coated With Fluoropolymer Solution (Rf(C8) Acrylate Homopolymer/AsahiClean AK-225)

A coated substrate was produced in the same manner as in Example 1, except that the fluorinated polymer A and the fluorinated solvent were respectively replaced with the Rf(C8) acrylate homopolymer obtained in Comparative Production Example 1 and Asahi Clean AK-225 (produced by AGC Corporation), and the heat treatment temperature was changed to 75° C. The liquid repellency and surface roughness were measured one day later.

Comparative Example 2: Substrate Coated With Fluoropolymer Solution (Rf(C8) Acrylate Homopolymer/AsahiClean AK-225)

A coated substrate was produced in the same manner as in Comparative Example 1, except that the heat treatment step (75° C.) was not performed. The liquid repellency and surface roughness were measured one day later.

Comparative Example 3: Base Material Coated With Fluoropolymer Solution Containing 1 Mass % of WP-140 Series Polymer/Novec 7300

A coated substrate was produced in exactly the same manner as in Example 1, except that the fluorinated polymer of Example 1 was replaced with OPTOACE WP-140 (a product with a polymer concentration of 5 mass %) produced by Daikin Industries Ltd., and the fluorinated solvent was replaced with Novec 7300. The liquid repellency and surface roughness were measured one day later.

Liquid Repellency of Substrates Coated With Rf(meth) Acrylate Homopolymer Described in Comparative Examples 1 to 3

In Comparative Examples 1 to 3, the sliding velocity was 20 mm/s at most, and the substrates of Comparative Examples 1 to 3 were obviously inferior to those of Examples 1 to 10.

Comparative Example 4: Substrate Coated With Fluorinated Silane (Optool UD-500 Series) (CVD Method)

Gorilla Glass 3 (produced by Corning Incorporated, USA) was surface-treated by a CVD method with Optool UD-500 series (Daikin Industries, Ltd.) having a perfluoropolyether-silane structure, thus producing a coated substrate. The average film thickness was about 10 nm. The liquid repellency and surface roughness of the produced substrate were measured one day later.

Comparative Example 5: Substrate Coated With Fluorosilane (Optool UD-500 Series) (Spray Method)

Optool UD-500 series was diluted with Novec 7200 to a concentration of 1 mass %, and Gorilla Glass 3 was surface-treated by a spray method with the Optool UD-500 series, thus producing a coated substrate. The liquid repellency and surface roughness of the produced substrate were measured one day later.

Comparative Example 6: Base Material Coated With Fluorosilane (Optool 500 Series) (Dip Method)

A silicone wafer was immersed in a solution in which Optool UD-500 series was diluted with Novec 7200 to a concentration of 1 mass %, and pulled out. The silicone wafer was then allowed to stand in air for a day and night, followed by ultrasonic cleaning in Novec 7200 and air drying, thus producing a coated substrate. The liquid repellency and surface roughness of the produced substrate were measured one day later.

Comparative Example 7: Production and Measurement of Base Material Coated With Fluorinated Silane (Rf(C8)TMS) (CVD Method)

100 µL of a perfluorooctyl ethyl trimethoxysilane (also referred to as "Rf(C8)TMS") was placed in a glass screw tube, and a silicone wafer was sealed in an autoclave, followed by heating at 100° C. for 2 hours. After cooling to room temperature, ultrasonic washing in Novec 7200 and air drying were performed to produce a coated substrate. The liquid repellency and surface roughness of the produced substrate were measured one day later.

Comparative Example 8: Production and Measurement of Base Material Coated With Fluorinated Silane (Rf(C8)TMS) (Dip Method)

A silicone wafer was immersed in a solution in which Rf(C8)TMS was diluted with Novec 7300 to 1 mass %, and pulled out. The silicone wafer was then allowed to stand in air for a day and night, followed by ultrasonic cleaning in Novec 7200 and air drying, thus producing a coated substrate. The liquid repellency and surface roughness of the produced substrate were measured one day later.

Liquid Repellency of Fluorinated Silane-Coated Substrates Described in Comparative Examples 4 to 8

In Comparative Examples 4 to 8, the sliding velocity was 23 mm/s or less even though the sliding angle was as small as 20° or less (except for Comparative Example 4). The results of Comparative Examples 4 to 8 were obviously inferior to those of Examples 1 to 10.

Comparative Example 9: Measurement of Melt Fluororesin. PFA Film

The liquid repellency and surface roughness of the melt fluororesin PFA film itself (product number: AP210, Daikin Industries Ltd.) were measured. The PFA is a copolymer of tetrafluoroethylene and perfluoroalkoxyethylene.

Comparative Example 10: Measurement of Melt Fluororesin FEP Film

The liquid repellency and surface roughness of the melt fluororesin FEP film itself (product number NP20, produced by Daikin Industries Ltd) were measured. The FEP is a copolymer of tetrafluoroethylene and hexafluoropropylene.

Liquid Repellency of Melt Fluororesin Films Described in Comparative Examples 9 and 10

In Comparative Examples 9 and 10, a droplet did not slide in the sliding velocity test even though the sliding angle was as small as 10° or less. The results of Comparative Examples 9 and 10 were obviously inferior to those of Examples 1 to 10.

Comparative Example 11: Base Material Coated With Hydrocarbon Silane (Rh(C6)TMS) (Dip Method)

A silicone wafer was immersed in a solution in which hexyltrimethoxysilane (also referred to as "Rh(C6)TMS") was diluted with butyl acetate to 1 mass %, and pulled out. The silicone wafer was then allowed to stand in air for a day and night, followed by ultrasonic cleaning in butyl acetate and air drying, thus producing a coated substrate. The liquid repellency and surface roughness of the produced substrate were measured one day later.

Liquid Repellency of Hydrocarbon-Based Silane-Coated Base Material Described in Comparative Example 11

In Comparative Example 11, the sliding angle was as large as 39°, and a droplet did not slide in the sliding velocity test. The results of Comparative Example 11 were obviously inferior to those of Examples 1 to 10.

Comparative Example 12: Base Material Coated With Hydrocarbon-Based Silane (Rh(C18)TMS) (Dip Method)

A coated substrate was produced in the same manner as in Comparative Example 11, except that the hydrocarbon-based silane Rh(C6)TMS was replaced with octadecyltrimethoxysilane (also referred to as "Rh(C18)TMS"). The liquid repellency and surface roughness of the produced substrate were measured one day later.

Liquid Repellency of Hydrocarbon-Based Silane-Coated Base Material Described in Comparative Example 12

In Comparative Example 12, the sliding velocity was as small as 5 mm/s even though the sliding angle was as small as 10° or less. The results of Comparative Example 12 were obviously inferior to those of Examples 1 to 10.

Comparative Example 13: Measurement of Silicone Rubber Sheet

The liquid repellency and surface roughness of the silicone rubber sheet itself (product number: SGS-1, Wakisangyo Co., Ltd.) were measured one day later.

Comparative Example 14: Measurement of Urethane Rubber Sheet

The liquid repellency and surface roughness of the urethane rubber sheet itself (product number UGS-11, Wakisangyo Co., Ltd.) were measured.

Liquid Repellency of Non-Fluorinated Rubber
Sheets Described in Comparative Examples 13 and
14

In Comparative Examples 13 to 14, the film had a sliding angle of 40° or more, and a droplet did not slide in the sliding velocity test. The results of Comparative Examples 13 and 14 were obviously inferior to those of Examples 1 to 10.

TABLE 1

| | Type of film | Sample | Base material | Heat treatment condition | Surface roughness Ra (μm) | Contact angle Water droplet content (μL) | Contact angle avg | Contact angle sd | Water droplet at sliding angle (μL) | Normal sliding angle (°) avg | Normal sliding angle (°) sd | 5-mm move-slide angle (°) avg | 5-mm move-slide angle (°) sd | Δα | Sliding speed (mm/s) avg | Sliding speed (mm/s) sd |
|---|---|---|---|---|---|---|---|---|---|---|---|---|---|---|---|---|
| Example 1 | Fluoropolymer A | Fluoropolymer A/FC-770 | Silicone wafer | 180° C. | 0.28 | 5 | 116.4 | 0.5 | 20 | 13 | 0 | 17 | 1 | 4 | 218 | 29 |
| Example 2 | | Fluoropolymer A/PFBz | | | 0.27 | | 115.2 | 0.2 | | 11 | 1 | 19 | 1 | 9 | 180 | 9 |
| Example 3 | | Fluoropolymer A/Novec 7100 | | | 0.28 | | — | — | | — | — | — | — | — | 225 | 34 |
| Example 4 | | Fluoropolymer A/Novec 7200 | | | 0.28 | | 116.3 | 0.4 | | 6 | 0 | 16 | 1 | 10 | 190 | 19 |
| Example 5 | | Fluoropolymer A/Novec 7300 | | | 0.26 | | — | — | | — | — | — | — | — | 207 | 52 |
| Example 6 | | Fluoropolymer A/FC-770 | | Without heat treatment | 0.30 | | — | — | | — | — | — | — | — | 173 | 12 |
| Example 7 | | Fluoropolymer A/PFBz | | | 0.30 | | — | — | | — | — | — | — | — | 181 | 28 |
| Example 8 | | Fluoropolymer A/Novec 7100 | | | 0.31 | | — | — | | — | — | — | — | — | 183 | 26 |
| Example 9 | | Fluoropolymer A/Novec 7200 | | | 0.30 | | 116.7 | 0.6 | | 7 | 1 | 21 | 1 | 15 | 182 | 17 |
| Example 10 | | Fluoropolymer A/Novec 7300 | | | 0.30 | | — | — | | — | — | — | — | — | 185 | 31 |
| Reference Example 1 | Super-water-repellent uneven surface | WO2017/179678 Example 6 | Aluminum plate | Without heat treatment | 14.7 | 2 | 150° or more | | 5 | 1° or less | | 1° or less | | 0 | 220 | 25 |
| Reference Example 2 | | HIREC 100; plate ID; 6500-2 | | Unknown | 17.2 | | | | | | | | | | 249 | 6 |
| Reference Example 3 | | Inner lid of Moringa yogurt container | Inner lid itself | Unknown | 11.5 | | | | | | | | | | 214 | 16 |
| Comp. Ex. 1 | Rf(meth)acrylate homopolymer | Rf(C8)acrylate homopolymer/AK225 | Silicone wafer | 75° C. | 0.30 | 5 | 117.1 | 0.6 | 20 | 19 | 1 | 25 | 1 | 6 | No sliding | |
| Comp. Ex. 2 | | | | Without heat treatment | 0.33 | | 116.9 | 0.5 | | 23 | 1 | 35 | 1 | 12 | No sliding | |
| Comp. Ex. 3 | Fluorosilane | WP-140/Novec-7300 | | 180° C. | 0.27 | 2 | 114.1 | 0.4 | 20 | 22 | 2 | 32 | 2 | 10 | 20 | 16 |
| Comp. Ex. 4 | | Optool UD-500 series (CVD) | Gorilla Glass 3 | Without heat treatment | 0.23 | 2 | 112.7 | 0.4 | 20 | 23 | 16 | 69 | 10 | 46 | 0 | 0 |
| Comp. Ex. 5 | | Optool UD-500 series (spray) | | | 0.24 | | 114.3 | 0.3 | | 5 | 0 | 49 | 1 | 44 | 0 | 0 |
| Comp. Ex. 6 | | Optool UD-500 series (dip) | Silicone wafer | | 0.25 | | 111.0 | 0.9 | | 7 | 1 | 33 | 1 | 26 | 23 | 10 |

TABLE 1-continued

| | Type of film | Sample | Base material | Heat treatment condition | Surface roughness Ra (μm) | Water droplet content (μL) | Contact angle avg | Contact angle sd | Water droplet at sliding angle (μL) | Normal sliding angle (°) avg | Normal sliding angle (°) sd | 5-mm move-slide angle (°) avg | 5-mm move-slide angle (°) sd | Δα | Sliding speed (mm/s) avg | Sliding speed (mm/s) sd |
|---|---|---|---|---|---|---|---|---|---|---|---|---|---|---|---|---|
| Comp. Ex. 7 | | Rf(C8)TMS (CVD) | Silicone wafer | | 0.26 | | 108.3 | 0.3 | | 16 | 3 | 39 | 3 | 23 | 0 | 0 |
| Comp. Ex. 8 | Melt fluororesin film | Rf(C8)TMS (dip) | Melt fluororesin film itself | Without heat treatment | 0.30 | | 106.6 | 1.1 | 20 | 8 | 1 | 28 | 1 | 20 | 10 | 2 |
| Comp. Ex. 9 | | PFA film (AP210) | | | 0.59 | 2 | 105.4 | 1.4 | 20 | 9 | 1 | 85 | 0 | 76 | No sliding | |
| Comp. Ex. 10 | | FEP film (NP20) | | | 0.79 | | 108.9 | 0.5 | 20 | 10 | 2 | 45 | 4 | 35 | No sliding | |
| Comp. Ex. 11 | Non-fluorine silane | Rh(C6)TMS (dip) | Silicone wafer | Without heat treatment | 0.28 | 2 | 64.0 | 1.0 | 20 | 39 | 5 | 62 | 8 | 23 | No sliding | |
| Comp. Ex. 12 | | Rh(C18)TMS (dip) | | | 0.29 | | 91.7 | 2.0 | 20 | 8 | 2 | 35 | 4 | 27 | 5 | 1 |
| Comp. Ex. 13 | Rubber sheet | Silicone rubber sheet (SGS-11) | Rubber sheet itself | Without heat treatment | 0.43 | 2 | 108.8 | 0.3 | 20 | 43 | 4 | 63 | 2 | 20 | No sliding | |
| Comp. Ex. 14 | | Urethane rubber sheet (UGS-11) | | heat treatment | 0.51 | | 96.1 | 4.3 | | 90 | | — | | — | No sliding | |

Example 12: Change in Contact Angle of Fluorpolymer A Film by Application of Voltage 440 parts by mass of Novec 7300 and 60 parts by mass of the fluoropolymer A obtained in Production Example 1 were placed in a 1-L polyethylene bottle, and the bottle was stirred with a rotor, thus obtaining a fluoropolymer solution with a fluoropolymer A concentration of 12 mass %.

The fluoropolymer solution was cast on an aluminum plate using a micro-gravure coater and passed through a drying furnace to produce a substrate in which a fluoropolymer film (average film thickness: 4 μm) was formed on the aluminum plate.

A droplet of 1 mass % saline water with a diameter of 3 mm was added to the fluoropolymer film of the substrate, and the saline water contact angle was measured. The contact angle at an applied voltage of 0 V (before voltage application) and at an applied voltage of 120 V (after voltage application) was respectively 115° and 75°.

Comparative Example 15: Change in Contact Angle of Commercially Available Fluoropolymer B Film by Application of Voltage A substrate in which the fluoropolymer B film (average film thickness: 4 μm) was formed on an aluminum plate was produced in the same manner as in Example 12 except that the fluoropolymer A was replaced with a commercially available fluoropolymer (also referred to as "fluoropolymer B"; Mw: 229738) containing a monomer unit represented by the following formula (10) and a monomer unit represented by the following formula (20) in a molar ratio of 65:35. The saline water contact angle was measured. The contact angle at an applied voltage of 0 V (before voltage application) and at 120 V (after voltage application) was respectively 112° and 93°.

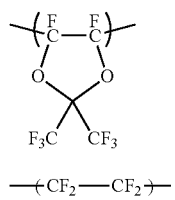
(10)

—(CF$_2$—CF$_2$)— (20)

Example 13: Electrowetting Device Using Fluoropolymer A

An electrowetting device was produced in the same manner as in Langmuir, 2012, 28(15), 6307-6312, except that Teflon (registered trademark) AF of the insulating film for electrowetting elements was replaced with the fluoropolymer A. Measurement showed that the sliding velocity of the insulating film for electrowetting elements measured at a frequency of 80 Hz and a droplet volume of 9 μL was 120 mm/s.

Comparative Example 16: Electrowetting Device Using Fluoropolymer B

An electrowetting device was produced in the same manner as in Example 13 except that the fluoropolymer A was replaced with commercially available fluoropolymer B. The results showed that the sliding velocity of the insulating film for electrowetting elements at a frequency of 80 Hz and a droplet volume of 9 μL was 90 mm/s.

The invention claimed is:

1. A base material having a surface directly coated with an insulating film for an electrowetting element, the insulating film comprising a fluoropolymer,
   the fluoropolymer containing a monomer unit represented by the following formula (1-11):

(1-11)

in an amount of 100 mol %, based on the total monomer units,
   the insulating film for an electrowetting element being a monolayer film, and
   the insulating film for an electrowetting element having the following properties:
   a sliding velocity of 150 mm/s or more at an inclination angle of 30° and
   an average surface roughness (Ra) of 1 μm or less.

2. The base material according to claim 1, wherein the insulating film for an electrowetting element further has the following property: a contact angle of 100° to 130°, wherein a liquid to determine the contact angle is water.

3. The base material according to claim 1, wherein the insulating film for an electrowetting element further has the following property: a total light transmittance of 90% or more.

4. The base material according to claim 1, wherein the insulating film for an electrowetting element further has the following property: a sliding angle of 15° or less.

5. The base material according to claim 1, wherein the insulating film for an electrowetting element has an average film thickness of 10 nm or more.

6. The base material according to claim 1, wherein the fluoropolymer has a glass transition temperature (Tg) of 100° C. or more.

7. The base material according to claim 1, wherein the base material is a glass base material or a plastic base material.

8. The base material according to claim 1, wherein the base material is a substrate for an electrowetting element.

9. The base material according to claim 1, wherein the insulating film for an electrowetting element contains the fluoropolymer in an amount of 80 mass % or more, based on the total mass of the film.

* * * * *